United States Patent [19]

Sato et al.

[11] Patent Number: 4,691,154
[45] Date of Patent: Sep. 1, 1987

[54] STEPPING MOTOR CONTROL SYSTEM

[75] Inventors: Masahiko Sato, Funabashi; Kazutoshi Kato, Narashino; Akira Ishibashi, Tokyo; Tsurumasa Matsushita, Narashino, all of Japan

[73] Assignee: Hitachi, Ltd., Tokyo, Japan

[21] Appl. No.: 852,756

[22] Filed: Apr. 16, 1986

[30] Foreign Application Priority Data

Apr. 16, 1985 [JP] Japan .................................. 60-79165
Apr. 22, 1985 [JP] Japan .................................. 60-84484

[51] Int. Cl.$^4$ .............................................. H02P 8/00
[52] U.S. Cl. ...................................... 318/696; 318/685; 318/567
[58] Field of Search ......................... 318/696, 685, 567

[56] References Cited

U.S. PATENT DOCUMENTS 4,600,868 7/1986 Bryant .................................. 318/567

Primary Examiner—William M. Shoop, Jr.
Assistant Examiner—Saul M. Bergmann
Attorney, Agent, or Firm—Antonelli, Terry & Wands

[57] ABSTRACT

It takes a comparatively long time for a rotor of a stepping motor to be positioned at the next target stop position (target angular position) and stopped there. This time is the settling time. Before the rotor passes through the next target angular position and begins to oscillate, necessary control is provided to reduce the magnitude of the oscillation for the purpose of shortening the settling time. The phase excitation on each winding of the stepping motor is usually changed over successively until the target angular position is reached. When the stepping motor has approached the target angular position, the changeover of phase excitation is gradually conducted. As a result, the magnitude of the above described oscillation is reduced and hence the settling time is shortened.

3 Claims, 18 Drawing Figures

| PHASE EXCITATION | S1 | S2 |
|---|---|---|
| A | H | H |
| B | H | L |
| C | L | L |
| D | L | H |

FIG. 11

| PHASE EXCITATION | P1 | P2 | P3 | P4 |
|---|---|---|---|---|
| A | H | L | H | L |
| B | H | L | L | H |
| C | L | H | L | H |
| D | L | H | H | L |

| No. | S1 | S3 | G1 | G2 | G3 | G4 | G5 | G6 |
|---|---|---|---|---|---|---|---|---|
| 1 | L | L | L | L | H | L | H | L |
| 2 | H | L | L | H | L | L | L | H |
| 3 | L | H | L | L | H | H | L | L |
| 4 | H | H | H | L | L | L | L | H |

STEPPING MOTOR CONTROL SYSTEM

BACKGROUND OF THE INVENTION

1. Field of the Invention

The present invention relates to drive positioning using a stepping motor and in particular to a stepping motor control system having reduced positioning and stopping time.

2. Description of the Prior Art

In head positioning and drive of a small-sized disk unit, for example, stepping motors have been widely used.

Figure 1:
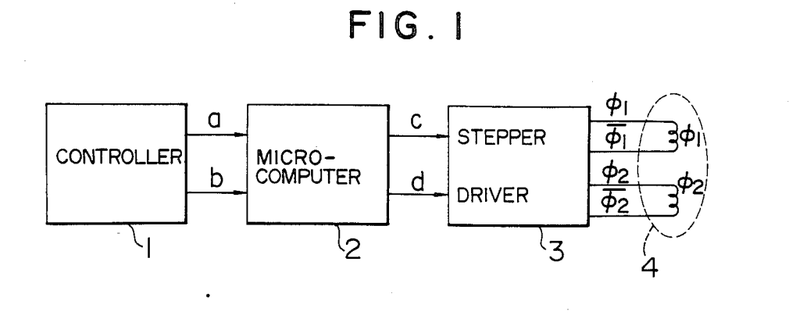
FIGS. 1 to 5 are drawings for illustrating the prior art.

An example of the conventional stepping motor control system for head positioning and driving used in such a disk unit will now be described. In FIG. 1, a controller 1 supplies a rotation direction signal a and a drive step number signal b to the microcomputer 2. In response thereto, the microcomputer 2 defines the optimum pulse rate pattern and supplies phase excitation changeover signals c and d to a driver 3.

When the signal c is "H", the driver 3 lets flow a current through a $\phi_1$-phase coil of a stepping motor 4 in a direction represented as $\phi_1 \rightarrow \bar{\phi}_1$. When the signal c is "L", the driver 3 lets flow a current in the opposite direction represented as $\bar{\phi}_1 \rightarrow \phi_1$. When the signal d is "H", the driver 3 lets flow a current through a $\phi_2$-phase coil of the stepping motor 4 in a direction represented as $\phi_2 \rightarrow \bar{\phi}_2$. When the signal d is "L", the driver 3 lets flow a current in a direction represented as $\bar{\phi}_2 \rightarrow \phi_2$.

As a result, the pulse motor 4 is rotated in a predetermined direction by as many steps as supplied from the controller 1. Thus the head of the disk unit is driven to be positioned at a predetermined position. The head drive and positioning operation at this case is referred to as "seek".

Figure 2:
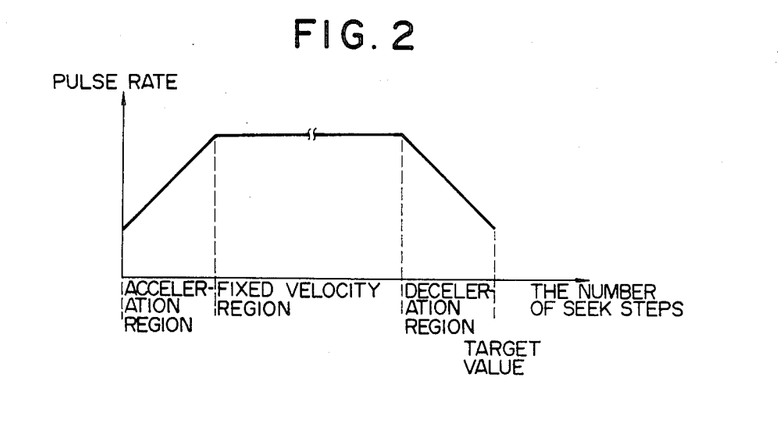

FIG. 2 shows the above described pulse rate pattern. In the starting acceleration region, the pulse rate is so raised that the acceleration may be constant from a low velocity up to a predetermined velocity to prevent the stepping motor 4 from getting out of step.

Subsequently, the pulse motor 4 stays in the fixed velocity region until the total number of seek steps minus the number of steps required for deceleration is reached. In the fixed velocity region, the pulse rate is held at a predetermined constant value to seek the head at the uniform velocity.

In the deceleration region, the pulse rate is lowered at a predetermined rate to seek the head with the uniform deceleration. And the head is stopped at the target position to be positioned.

Figure 3:
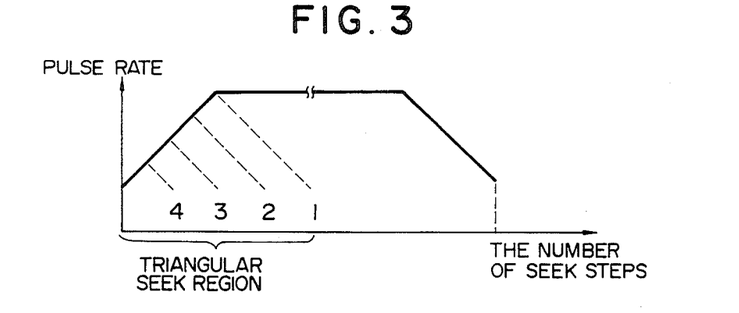

Increase or decrease in the number of seek steps, i.e., increase or decrease in the distance the head moves is dealt with by changing the number of steps included in the fixed velocity region so as not to change the curves of acceleration and deceleration. When the number of seek steps has become smaller than the sum of the number of steps included in the acceleration region and the number of steps included in the deceleration region, however, the acceleration region is immediately succeeded by the deceleration region as represented by broken lines 1 to 4 in FIG. 3. That is to say, control is effected by the so-called triangular seek.

Figure 4:
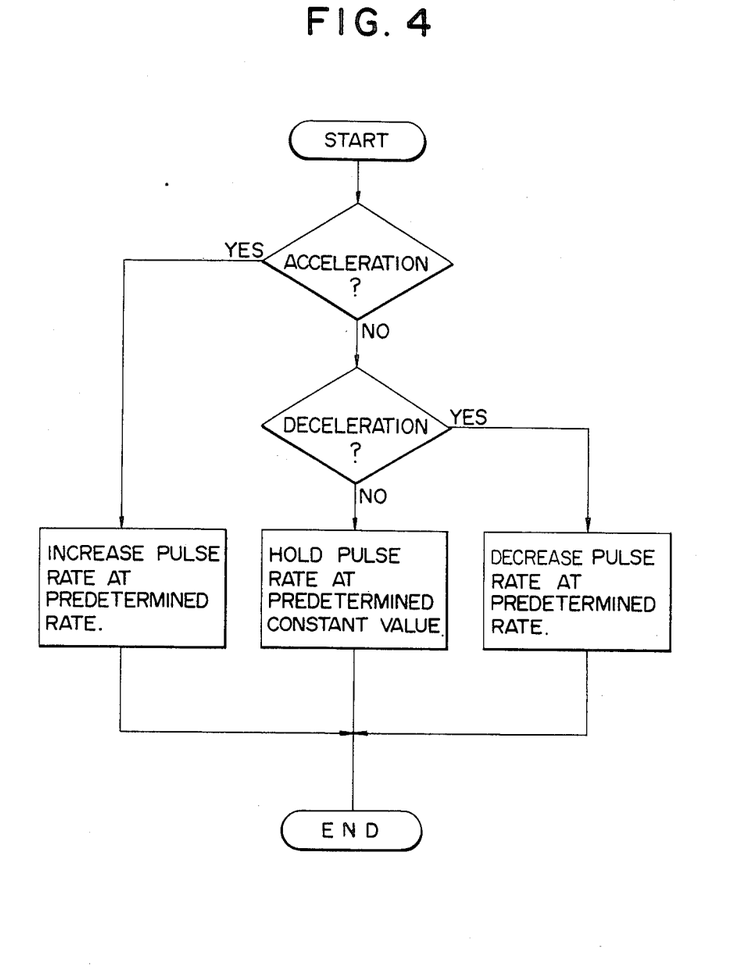

Therefore, the control procedure of the microcomputer 2 at this time is represented by FIG. 4.

Figure 5:
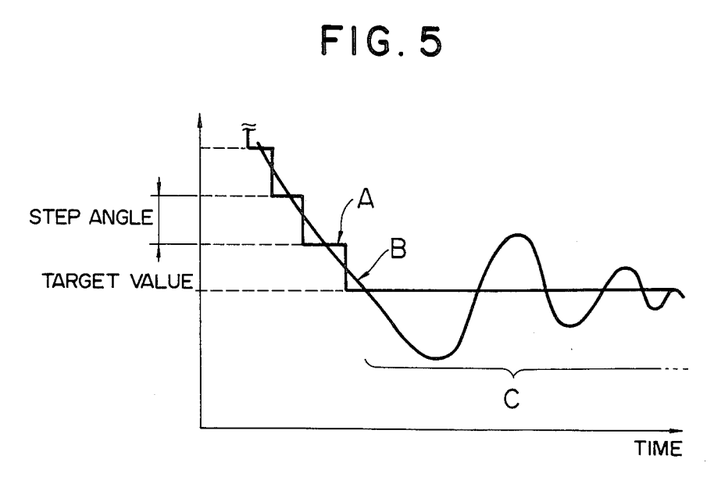
Figure 6:
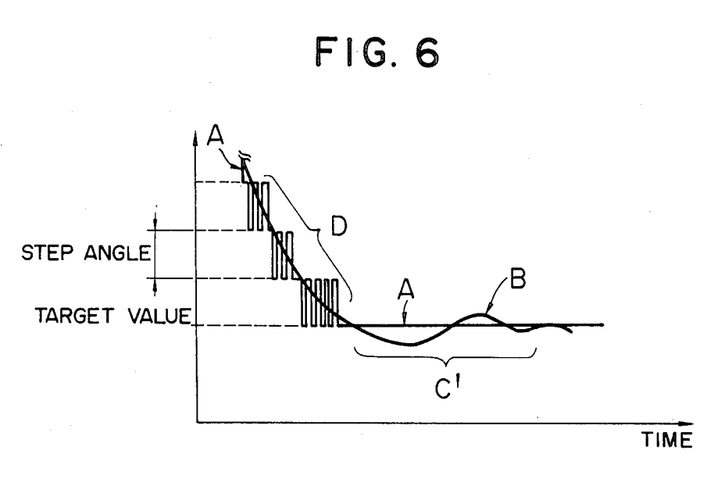
FIG. 6 is a diagram for illustrating the positioning operation of the stepping motor.

In the deceleration region, the rotation angle of the stepping motor 4 changes as shown in FIG. 6. As well known, the stepping motor is configured to successively rotate while taking discrete stationary stabilized angles each time the phase excitation is changed over, i.e., for each step. In the prior art, therefore, the step commands are so supplied as to form stairs as represented by A of FIG. 5. The rotation of the stepping motor follows it as represented by B of FIG. 5.

In this control system of the prior art, therefore, the rotation angle of the stepping motor becomes oscillatory as represented by a period C of the rotation angle characteristics B after the stepping motor 4 reaches the target rotation angle position and the stepping operation is stopped, i.e., the phase excitation state is stationary. It thus takes long time for the motor to converge to the target angle position and stop, the so-called settling time being elongated.

In disk units or the like, the settling time at the completion of the head seek is desired to be short as far as possible.

In a widely used method heretofore, therefore, a mechanical damper is added to the drive section.

However, the use of the mechanical damper results in large-sized units. Therefore, it is desirable to remove the mechanical damper to attain the smallsized system.

If the mechanical damper is removed, however, the settling becomes very long, resulting in long access time.

Therefore, a small-sized disk unit using a stepping motor of the prior art has a problem that it is difficult to shorten the access time.

Such a disk unit is disclosed in Japanese Patent Unexamined Publication No. 122270/80, for example.

SUMMARY OF THE INVENTION

An object of the present invention is to shorten the so-called settling time measured from the time when the rotor of the stepping motor begins to move at an arbitrary angular position to the time when the rotor stops at the next target angular position.

Another object of the present invention is to realize shortened settling time by control means to avoid the large size of the unit attendant upon the use of mechanical means.

In accordance with the present invention, therefore, rotation of the rotor of the stepping motor beyond the target angular position and the succeeding vibration of the rotor around the target angular position are lightened. To be concrete, the amount or angle of rotation of the rotor beyond the target angular position is reduced. In accordance with the present invention, therefore, fixed control means is taken before the rotation of the rotor gets beyond the target angular position. In a preferred embodiment of the present invention, the transition of phase excitation for each winding of the stepping motor, i.e., the transition from one phase excitation to the next step phase excitation is gradually carried out. In another embodiment of the present invention, the voltage applied to each winding of the stepping motor is changed over to a lower needed value with needed timing.

BRIEF DESCRIPTION OF THE DRAWINGS

FIGS. 6 to 8 are drawings for illustrating a first embodiment of the present invention.

FIGS. 9 to 18 are drawings for illustrating a second embodiment of the present invention.

Among FIGS. 6 to 18.

DESCRIPTION OF THE PREFERRED EMBODIMENTS

A stepping motor control system according to the present invention will now be described in detail by referring to illustrated embodiments.

In an embodiment of the present invention which will now be described, the hardware configuration is the same as that of FIG. 1 of the prior art excepting that a part of changeover control between steps of phase excitation for the stepping motor 4 is effected alternately and repeatedly by using the PWM (Pulse Width Modulation) system as illustrated in FIG. 6 when the motor 4 has entered the deceleration region. In this embodiment, therefore, the control procedure of the microcomputer 2 is modified as shown in FIG. 7.

Figure 7:
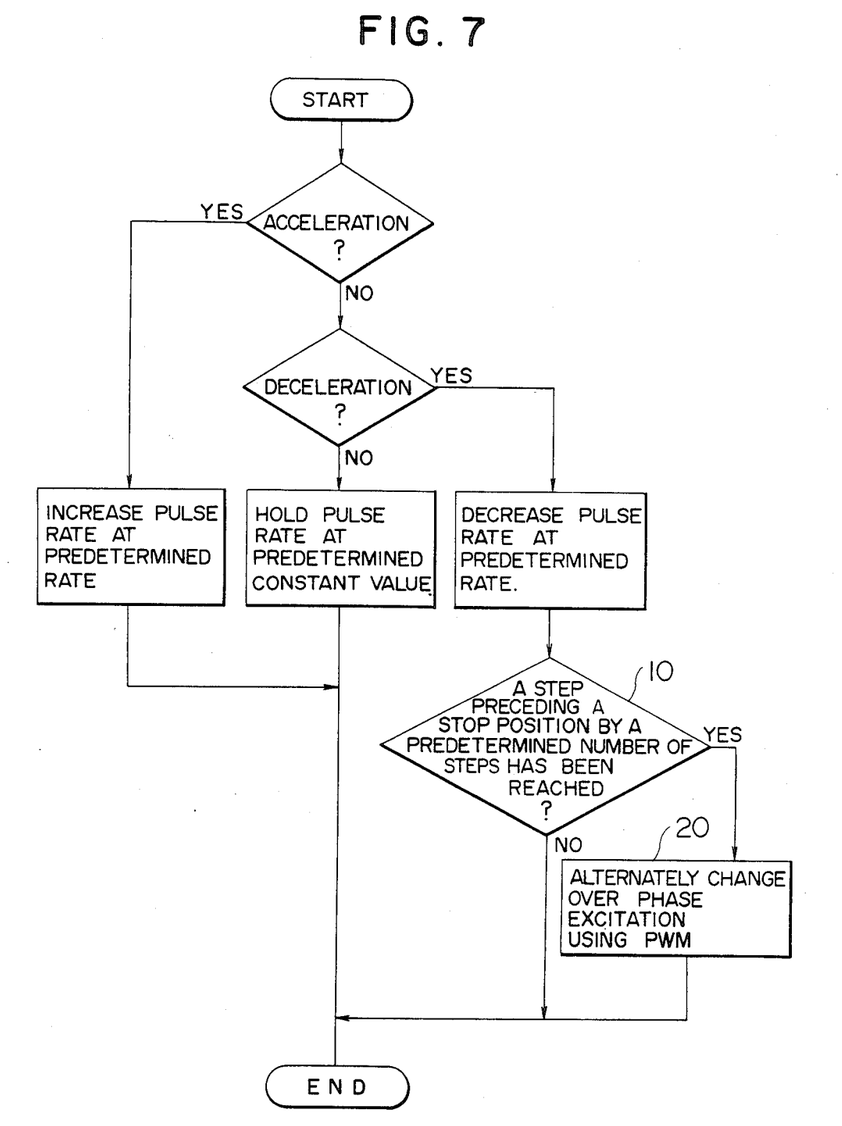
FIG. 7 is a flow chart illustrating the procedure for controlling the stepping motor.
Figure 8:
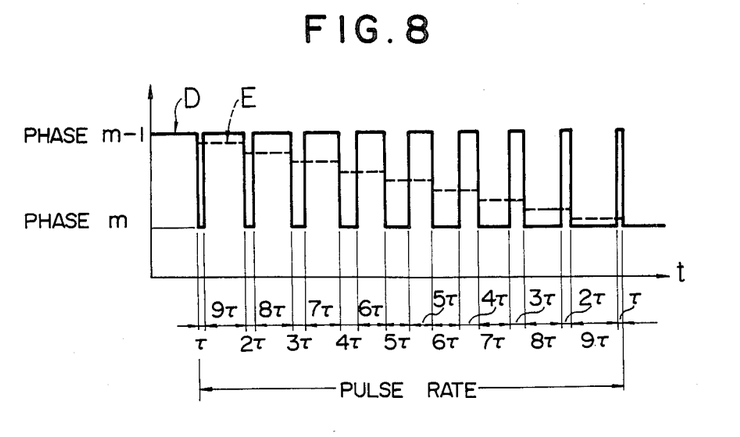
FIG. 8 is a diagram for illustrating the pulse width modulation control.

Processing steps 10 and 20 of FIG. 7 are the modified (added) part for this embodiment. At processing step 10, it is judged whether the stepping motor 4 has reached a step preceding the target rotation angle position by a predetermined number of steps, say, 3 steps. At the next step 20, alternate changeover of phase excitation using the so-called PWM is conducted. When the stepping motor 4 must be transferred from a particular step, say, step $(n-1)$ to the next step or step n, the excitation state at phase $(m-1)$ corresponding to step $(n-1)$ is not changed over directly to the excitation state at phase m corresponding to the next step n. Instead, changeover between the excitation at phase $(m-1)$ and the excitation at phase m is conducted during the pulse rate alternately and repeatedly with a period $(10\tau)$ sufficiently shorter than the pulse rate as shown in FIG. 8. At this time, the ratio of excitation duration of phase m to that of phase $(m-1)$ is successively increased. Finally, transfer of the excitation state from phase $(m-1)$ to phase m is completed when the pulse rate duration has elapsed.

Any method may be used for judgment at processing step 10. In an example, the number of steps of the stepping motor 4 is counted, and it is judged whether the counted value has reached the number of steps up to the target value minus a predetermined value (3, for example) or not.

In this embodiment, therefore, the stepping motor 4 is driven as illustrated in FIG. 2. When the state preceding the target value by 3 steps is reached, the answer at processing step 10 of FIG. 7 becomes YES and the processing step 20 is carried out. As represented by A of FIG. 6, therefore, the phase excitation state between steps takes the form of PWM as illustrated in FIG. 8 during the period D. On the basis of the time constant of the circuit including the coil of the stepping motor 4, the average value of excitation current at phase $(m-1)$ successively decreases as represented by broken lines E of FIG. 8. On the contrary, the average value of excitation current at phase m is successively increased with the same rate as the above described decrease. When the pulse rate period is over, the excitation state of phase m is assumed.

In this embodiment, therefore, the rotation of the rotor of the stepping motor 4 between steps becomes sufficiently smooth when the rotation angle approaches the target value. When the target value is reached, the stepping motor 4 can be stopped in an extremely short period C' causing little vibration. In case the embodiment is applied to the head seek of a disk unit, it is possible to sufficiently shorten the access time.

In the above described embodiment, the period D of FIG. 6 is composed of the last three steps of the deceleration region. So far as the last step at the stop side of the deceleration region is included, the period D may be composed of an arbitrary number of steps. It is a matter of course that the period D may be composed of all steps in the deceleration region, for example.

In this embodiment described heretofore, it is possible to sufficiently suppress the vibration of the stepping motor caused when the motor is stopped and positioned, by using only electrical control to the stepping motor. It is thus possible to eliminate the drawbacks of the prior art and sufficiently shorten the settling time without using a mechanical damper. As a result, a small-sized disk unit having sufficiently high performance is realized.

Further, this embodiment needs mainly software arrangements and need little change in hardware, resulting in cost saving.

Further, this embodiment can be applied not only to the above described disk unit but also to any unit using a stepping motor controlled by a microcomputer. Since only the software modification is needed, this embodiment can also be applied to a system in operation easily, resulting in high universality.

Another embodiment shown in FIGS. 9 to 18 will now be described. In this embodiment as well, a stepping motor 100 is used for positioning the read/write head in a small-sized magnetic disk unit. By controlling the rotation angle of the motor 100, the head is positioned on a predetermined track of the disk through a capstan, a steel belt and a carriage which are not illustrated in FIG. 9. The motor 100 is two-phase bipolar type, for example, and has a pair of windings $\phi_1$ and $\phi_2$.

Figure 9:
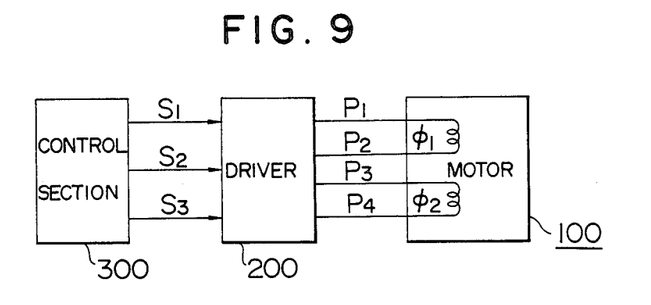
FIG. 9 is a circuit diagram for controlling the stepping motor.
Figure 10:
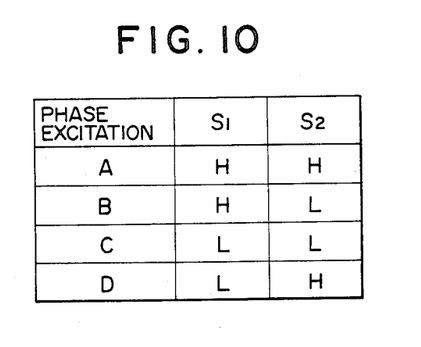
FIGS. 10 and 11 are truth tables relating to FIG. 9.
Figure 11:
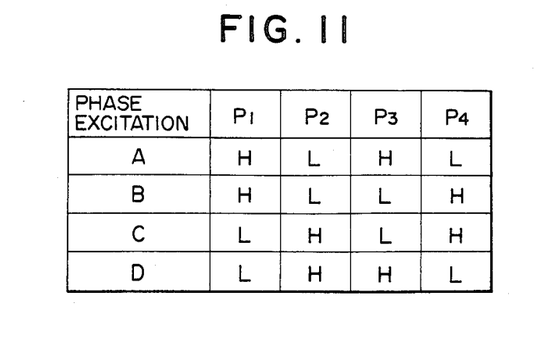
Figure 14:
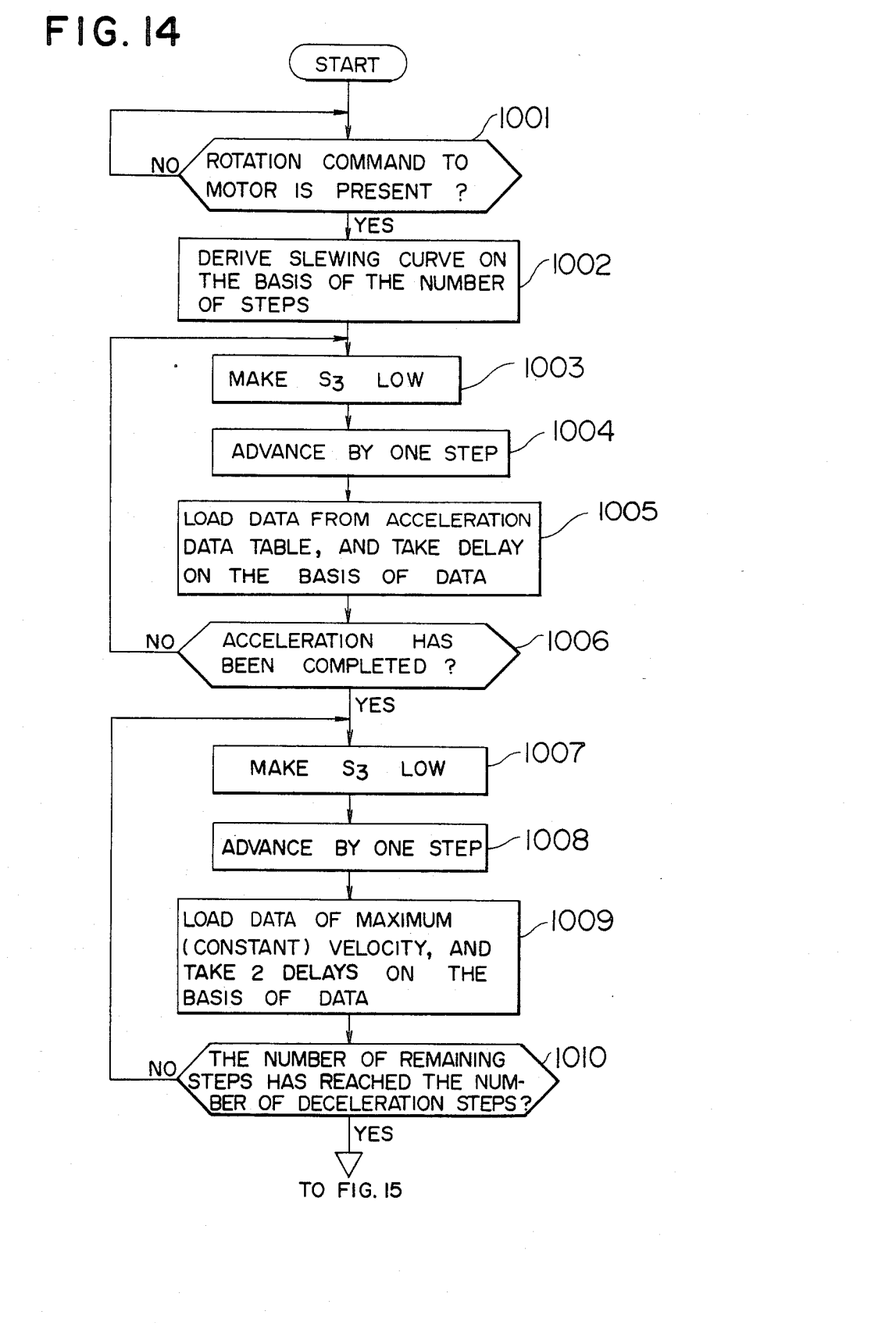
FIGS. 14 and 15 are flow charts for illustrating procedures of the control.
Figure 15:
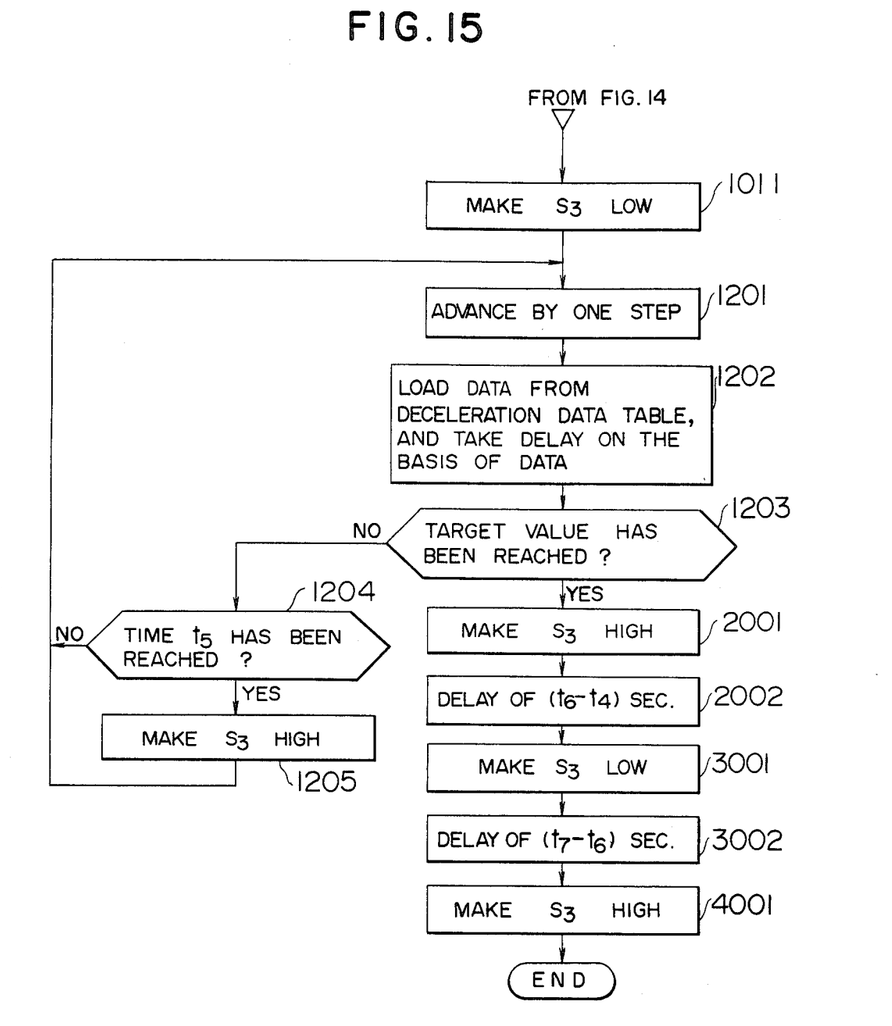

Numeral 300 denotes a control section of the disk unit. The control section 300 has a microprocessor unit and program memory means for operating a driver 200. The program is shown in FIGS. 14 and 15. Truth tables relating to FIG. 9 are shown in FIGS. 10 and 11. Under the state of phase excitation A wherein both signal lines $S_1$ and $S_2$ are "H" (High), feeders $P_1$, $P_2$, $P_3$ and $P_4$ respectively assume "H", "L", "H" and "L" levels as shown in the truth table. When the feeder $P_1$ is "H" and the feeder $P_2$ is "L", the polarity of the input voltage to the winding $\phi_1$ becomes as $P_1 \rightarrow P_2$. That is to say, the feeder $P_1$ becomes the positive pole and the feeder $P_2$ becomes the negative pole. The magnitude of the input voltage is either 12 V or 5 V, for example. The changeover of the voltage level is effected by a signal line $S_3$.

When the signal line $S_3$ is "H", the voltage level becomes 12 V. When the signal line $S_3$ is "L", the voltage level becomes 5 V. If the phase excitation of the windings $\phi_1$ and $\phi_2$ proceeds in the order of A, B, C and D, the motor 100 rotates in the regular direction. If the phase excitation proceeds in the order of D, C, B and A, the motor 100 rotates in the reverse direction.

Figure 12:
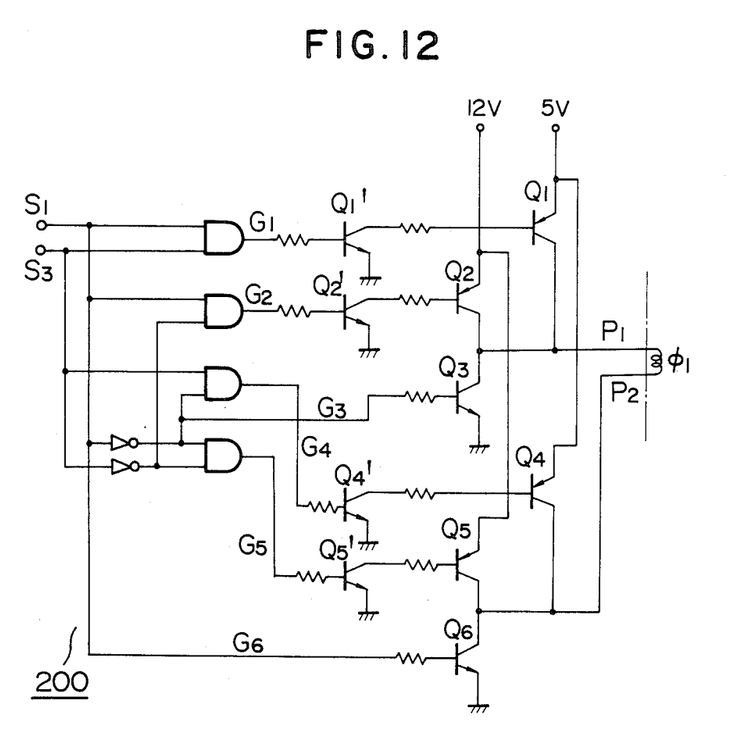
FIG. 12 is a detail circuit diagram of a driver illustrated in FIG. 9.
Figure 13:
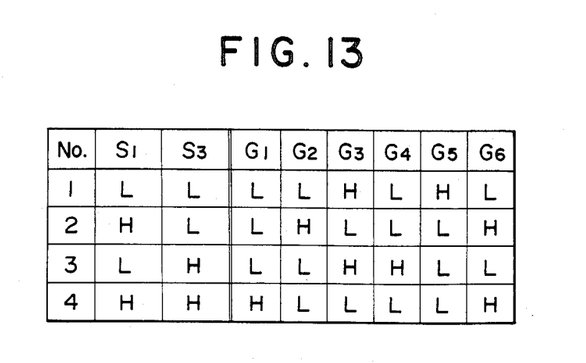
FIG. 13 is a truth table relating to the circuit of FIG. 12.

FIG. 12 shows an example of internal configuration of the driver 200. A portion of the driver 200 corresponding to the winding $\phi_1$ is illustrated in FIG. 12, and a portion corresponding to the winding $\phi_2$ is omitted. In the circuit of FIG. 12, switching transistors such as $Q_1$ and $Q_2$, NOT gates, and AND gates are used. FIG. 13 shows a truth table relating to FIG. 12. When a signal line $G_n$ ($G_1$, for example) shown in the table becomes "H", the transistor $Q_n$ ($Q_1$, for example) turns ON. If n is 1, 2, 4 or 5 (1, for example), the transistor $Q_n'$ ($Q_1'$, for example) also turns ON. When a signal line $G_n$ is "L", the corresponding transistor is OFF. On the basis of combination of "H" and "L" on signal lines $S_1$ and $S_3$, four states No. 1 to No. 4 can be considered as follows.

No. 1 (transistors $Q_3$ and $Q_5$ are "ON"):
A circuit represented as 12 V power supply→$Q_5$→$P_2$→$\phi_1$→$P_1$→$Q_3$→GND (earth) is established. This corresponds to the phase excitation C or D shown in FIGS. 10 and 11.

No. 2 (transistors $Q_2$ and $Q_6$ are "ON"):
A circuit represented as 12 V power supply→$Q_2$→$P_1$→$\phi_1$→$P_2$→$Q_6$→GND (earth) is established. This corresponds to the phase excitation A or B.

No. 3 (transistors $Q_3$ and $Q_4$ are "ON"):
A circuit represented as 5 V power supply→$Q_4$→$P_2$→$\phi_1$→$P_1$→$Q_3$→GND (earth) is established. This corresponds to the phase excitation C or D.

No. 4 (transistors $Q_1$ and $Q_6$ are "ON"):
A circuit represented as 5 V power supply→$Q_1$→$P_1$→$\phi_1$→$P_2$→$Q_6$→GND (earth) is established. This corresponds to the phase excitation A or B.

Figure 16:
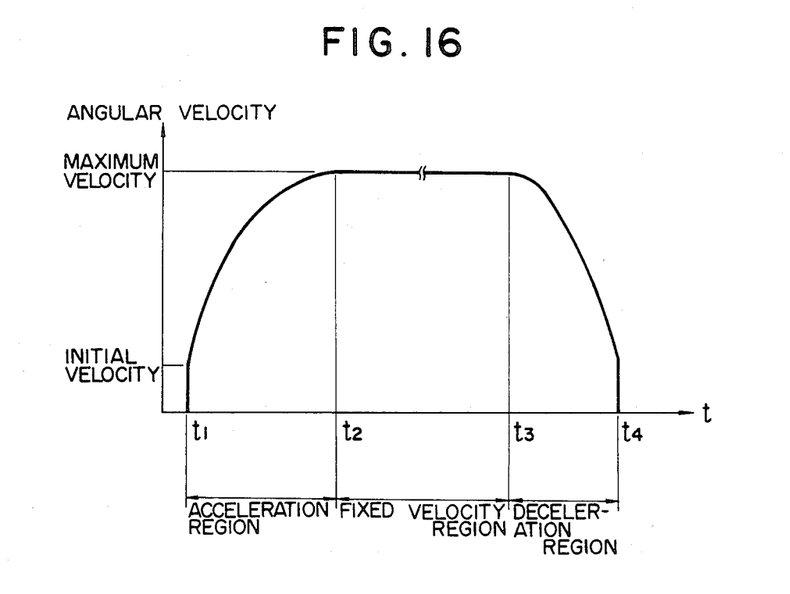
FIG. 16 is a waveform diagram for illustrating the slewing curve.
Figure 17:
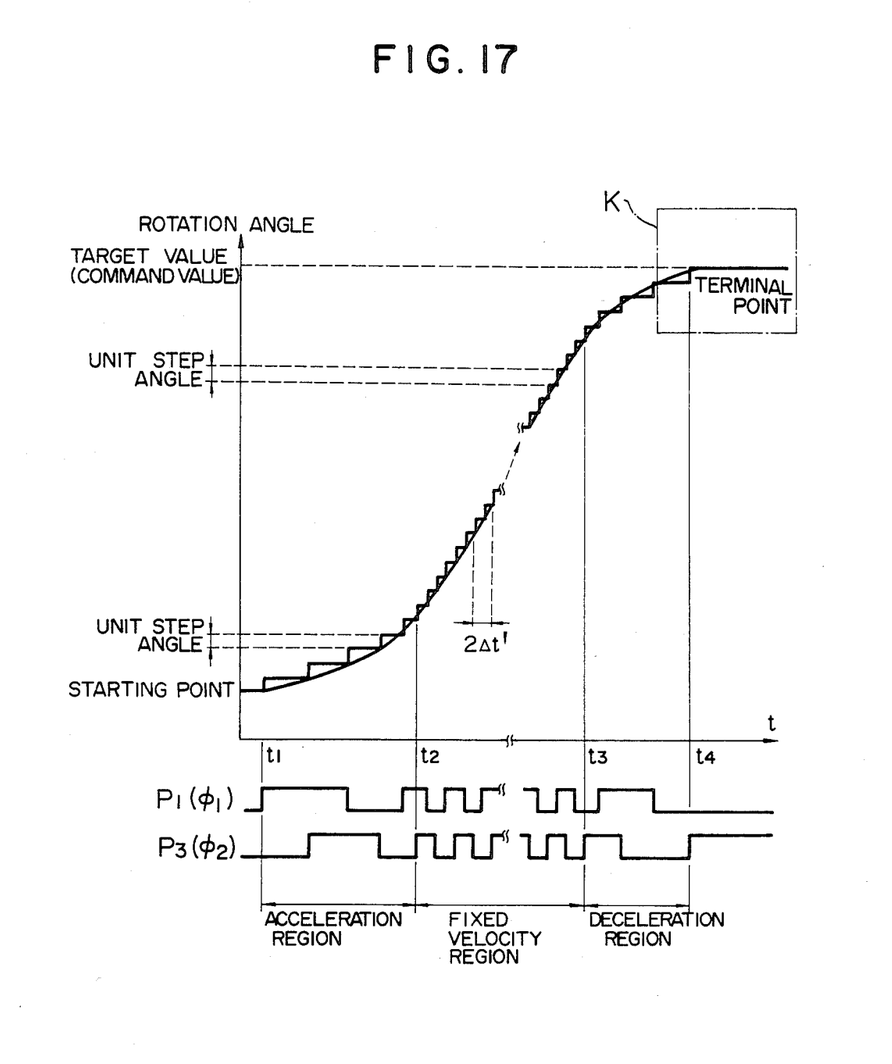
FIG. 17 is an operation diagram for illustrating the rotation angle of the rotor.

By referring to flow charts of FIGS. 14 and 15 as well as FIGS. 16 and 17, the control system will now be described. The program for the control system is previously stored in the control section of FIG. 9.

FIGS. 14 and 15 show a series of processing steps conducted from the time when the next target rotation angle for the stepping motor 100 is specified until the time when the positioning at the rotation angle is completed and the input of the next target rotation angle is waited.

The command of the next target rotation angle is waited at step 1011 of FIG. 14. The contents of this command are the rotation direction and the number of steps. At step 1002, the slewing curve as illustrated in FIG. 16 is derived. This curve is a kind of speed pattern for acceleration and deceleration control. The curve is divided into the acceleration region ($t_1$ to $t_2$), fixed velocity region ($t_2$ to $t_3$), and deceleration region ($t_3$ to $t_4$). The pattern used in the acceleration region ($t_1$ to $t_2$) has been predetermined to rapidly accelerate the stepping motor so far as the motor is prevented from being out of step (out of synchronism). This pattern is stored in an acceleration data table. The maximum velocity in the fixed velocity region ($t_2$ to $t_3$) is also predetermined. The pattern of the deceleration region ($t_3$ to $t_4$) is also predetermined and its data are stored in a deceleration data table. The timing at the end of the deceleration region ($t_3$ to $t_4$) of FIG. 16 is so determined that the number of steps corresponding thereto may coincide with that specified by the rotation command. If the number of steps is small, the fixed velocity region ($t_2$ to $t_3$) becomes short or zero. If the number of steps is further small, a higher velocity area in the deceleration region ($t_3$ to $t_4$) and the acceleration region ($t_1$ to $t_2$) is eliminated. On the way of acceleration, therefore, deceleration is started.

At step 1003, the output of the signal line $S_3$ is changed to "L" (Low). As a result, the input voltage of the motor 100 is held at a high value 12 V.

At step 1004, one step is taken. This aims at changing the phase excitation shown in FIGS. 10 and 11 from "C" to "B", for example. To be concrete, the signal lines $S_1S_2$ are changed from "L""L" to "H""L". As a result, the rotation phase of the stepping motor 100 advances by the unit step.

At step 1005, a necessary delay is taken. This delay is a time interval between one step and the next step supplied from the acceleration data table. Since the unit step angle is constant, the delay becomes the reciprocal of the speed. FIG. 17 is rewritten from FIG. 16. The ordinate of FIG. 17 represents the rotation angle. The intersection resulting from dividing the rotation angle by the unit step angle width indicates the timing of each step command (processing in step 1004). FIG. 17 also shows states "L" and "H" of the feeder $P_1$ relating to the winding $\phi_1$ and the feeder $P_3$ relating to the winding $\phi_3$.

At step 1006, it is judged whether the acceleration has been completed. That is to say, it is checked whether the time $t_2$ (or the corresponding number of steps) is over or not. If the acceleration region is still effective, step 1003 is resumed. Otherwise step 1007 is taken.

At step 1007, the signal line $S_3$ is made "L". That is to say, the input voltage is made 12 V, and one step is taken at step 1008. The delay in step 1009 is constant. At step 1010, it is judged whether the timing $t_3$ of the deceleration region is reached or not. This judgment is conducted by comparing the number of remaining steps (the number of projected steps) with the number of deceleration steps (reference value). Unless the deceleration region ($t_3$ to $t_4$) is not reached, processing is repeated from step 1007. If the deceleration region is reached, processing is advanced to step 1011 of FIG. 15.

At step 1011 as well, the input voltage is set to 12 V. At step 1201, another step is taken. At step 1202, a necessary delay is taken. And processing is advanced to step 1203.

Figure 18:
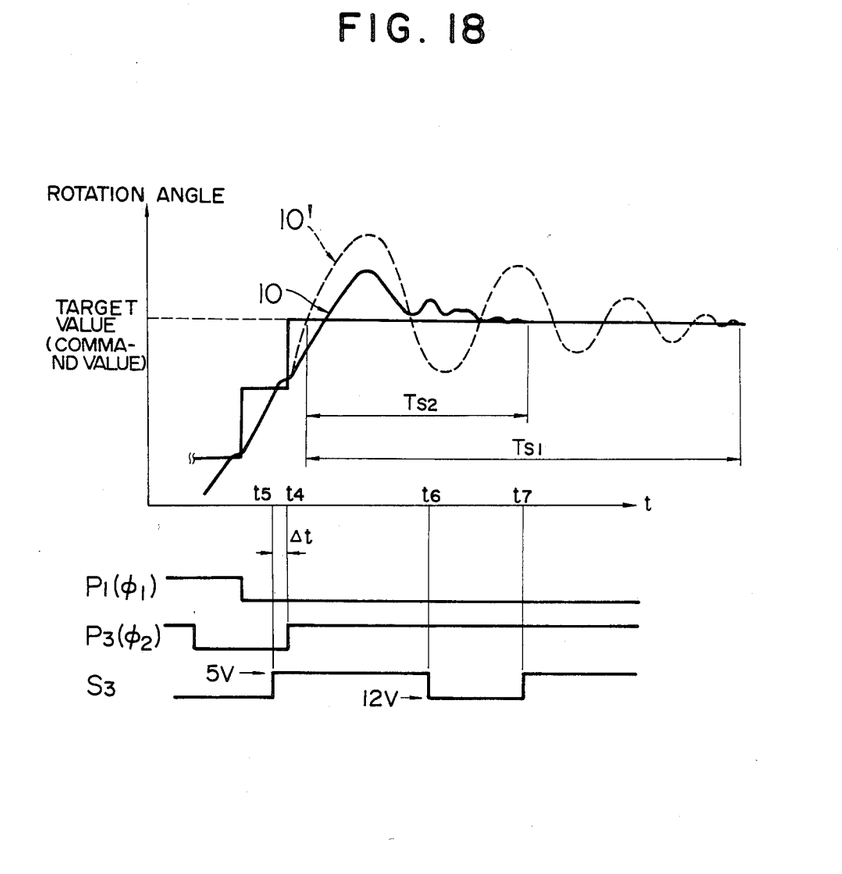
FIG. 18 is a more detail operation diagram for a principal part of FIG. 17.

Processing flow from step 1203 on will now be described by referring to FIG. 18. FIG. 18 is an enlarged view of a portion K shown in FIG. 17. The actual rotation phase of the stepping motor 100 is shown as a waveform 10. States of the signal line $S_3$ is also shown. At step 1203, it is judged whether the target value (command value) is reached or not by checking whether the timing $t_4$ previously computed at step 1002 or the number of steps corresponding thereto is reached or not. Since the feedback control is not conducted here, this is a problem on the computation level.

Unless the target value is not reached, it is judged at step 1204 whether predetermined timing $t_5$ has been reached or not. In any case, step 1201 is resumed thereafter. If the timing $t_5$ is reached, however, the signal line $S_3$ is changed over to "H" before step 1201 is resumed. As a result, the input voltage to the motor 100 is set to the lower value of 5 V. The timing $t_5$ is defined by taking the timing $t_4$ computed at step 1002 as reference and previously holding the value of $t_4 - t_5$ as a constant. This constant $\Delta t$ ranges from zero to $2\Delta t'$. As illustrated in FIG. 17, 2Δt' is the length of 2 steps in the fixed velocity region.

After the target value has been reached, the input voltage is changed to 5 V at step 2001. By considering this together with step 1205, it is understood that the signal line $S_3$ turns "H" to change the input voltage to 5 V when the target position or the timing $t_5$ is reached.

A delay of $(t_6-t_4)$ seconds is taken at step 2002 and the signal line $S_3$ is changed to "L" to select 12 V at step 3001. And a delay of $(t_7-t_6)$ seconds is taken at step 3002, and the signal line $S_3$ is changed to "H" to select 5 V. Thus the processing is completed. By the processing from step 2002 on, the input voltage is changed from 12 V to 5 V at time $t_5$, changed to 12 V at time $t_6$, and changed to 5 V at time $t_7$ as shown in FIG. 18. In this way, 12 V is maintained until the time $t_5$. This 12 V is the higher value and the rated value of the stepping motor 100. In order to arrive at the target value quickly, 12 V is maintained until the time $t_5$. In order to shorten the settling time or $T_{s2}$ of FIG. 18, 5 V is maintained until the time $t_6$. In order to eliminate the offset, 12 V is maintained until the time $t_7$. In order to lower the holding torque, save the dissipated power and restrict the generated heat, 5 V is maintained from the time $t_7$ on.

The waveform 10 of FIG. 18 is oscillatory and a settling time $T_{s2}$ is required for the oscillation to disappear. When $t_5=t_4, t_6-t_5=15$ ms, and $t_7-t_6=10$ ms, an experiment showed that the settling time $T_{s2}$ was approximately 25 ms. If 12 V was maintained over all periods in this case, the settling time $T_{s1}$ was unfavorably approximately 50 ms. The waveform of the rotation phase at this time is represented by 10'.

In case the input voltage is not changed over as represented by the waveform 10', it takes a comparatively long time $(T_{s1})$ for the oscillation of the system to be damped because a strong pullback force is acted on the overshoot from the target value. If the input voltage is lowered to reduce the torque in this period according to the present invention, the pullback force is weakened to shorten the settling time $(T_{s2})$. If a stepping motor originally having a low torque is used, the velocity until the target value is reached is lowered, resulting in a longer settling time.

The time $t_5$ when the input voltage is lowered is so preset as to shorten the settling time $T_{s2}$. If $t_4-t_5=\Delta t$ is made larger than the above described 2Δt', however, the stepping motor 100 becomes out of step, resulting in a different problem. In general, there is no fear that the stepping motor becomes out of step in the range of 2Δt', i.e., in the range of 2 steps in the fixed velocity (maximum velocity).

The aforementioned offset means a difference from the target value (command value). That is to say, the rotation phase is settled on a value displaced from the target value. Since this offset is caused in case of an insufficient torque, the input voltage is changed over to 12 V again in the period of $t_6$ to $t_7$ as described before. It is desirable to define the changeover time $t_6$ so that the latter 50 to 20% of the period of the settling time $T_{s2}$ becomes to the 12 V period.

If the changeover time $t_6$ is too early, the effect of reducing the settling time is weakened. If the changeover time $t_6$ is too late, the stepping motor is not settled on the target value, causing an offset.

As described above, the input voltage is maintained at a high value in a first process included in a series of processes. The first process means a process until the vicinity of the command value (commanded rotation angle) is approached. The first process corresponds to the processing in steps 1003 to 1011 of FIGS. 14 and 15. In a second process wherein the rotation phase is close to the commanded value, the input voltage is maintained at a low value. The second process corresponds to processing in steps 2001 and 2002. The processing in steps 1201 to 1205 is overlapped with the first and second processes.

In the above described embodiment, a stepping motor of two-phase bipolar type is used and the input voltage is changed over from 12 V to 5 V. However, this is only an example. Different forms may be used.

We claim:

1. In a positioning mechanism using a stepping motor having a rotor as a drive source, a stepping motor control system comprising:
   means for determining that the phase excitation state of said stepping motor has reached a phase excitation state preceding the phase excitation state at a target stop position by a predetermined number of steps; and
   control means for transferring the excitation state from one phase excitation state to another phase excitation state by successively decreasing one phase excitation current and successively increasing another phase excitation current, said control means being activated upon arrival of the rotor of said stepping motor at a phase state preceding the phase excitation state at the target stop position by a predetermined number of steps.

2. A stepping motor control system according to claim 1, wherein said control means comprises pulse width modulation control means for changing over the excitation state between phase excitation states alternately and repeatedly on a time division scheme.

3. A stepping motor control system including a series of steps for advancing the rotation position of a stepping motor step by step until a rotation angle previously commanded is reached and stopping said stepping motor at said commanded rotation angle, comprising:
   a first step for connecting said stepping motor to a first voltage source providing a first voltage to said stepping motor to make the rotation position of said stepping motor approach said commanded rotation angle; and
   a second step for connecting said stepping motor to a second voltage source providing a second voltage lower than said first voltage to said stepping motor upon arrival of said stepping motor at a rotation position close to said commanded rotation angle.

* * * * *